United States Patent [19]

Van Dine

[11] 4,325,139
[45] Apr. 13, 1982

[54] CIRCUIT FOR COMBINING DELTA MODULATED SIGNALS

[75] Inventor: Gilbert A. Van Dine, Winfield Township, DuPage County, Ill.

[73] Assignee: Bell Telephone Laboratories, Incorporated, Murray Hill, N.J.

[21] Appl. No.: 181,983

[22] Filed: Aug. 28, 1980

[51] Int. Cl.³ .............................................. H04M 3/56
[52] U.S. Cl. .................. 375/28; 179/1 CN; 179/18 BC; 340/347 C; 370/62
[58] Field of Search ................... 340/347 C, 347 DD; 179/1 CN, 18 BC; 235/92 EV, 92 SA; 307/222 R; 328/44; 370/62; 375/28, 33

[56] References Cited

U.S. PATENT DOCUMENTS

| | | | |
|---|---|---|---|
| 3,980,953 | 9/1976 | Nance et al. | 340/347 DD |
| 4,006,475 | 2/1977 | Candy et al. | 340/347 DA |
| 4,162,376 | 7/1979 | Hirschmann | 179/18 BC |
| 4,215,247 | 7/1980 | Lambert | 179/18 BC |

*Primary Examiner*—Benedict V. Safourek
*Attorney, Agent, or Firm*—P. Visserman

[57] ABSTRACT

A circuit for combining a plurality of delta modulated speech signals, each signal being represented by a stream of input bits. Once each clock cycle, a multiplexer (101) sequentially applies one bit from each of the streams to an up-down counter (103) to either increment or decrement a count contained therein. The state of the most significant bit position of the up-down counter is then stored in a D-type flip-flop (104). A feedback bit assumes the inverse state of the stored most significant bit position and is sequentially applied under the control of a binary counter (102) to the up-down counter along with a bit from each of the streams during the next clock cycle. An output bit assumes the state of the stored most significant bit position, and an output signal consisting of a plurality of output bits from successive clock cycles represents the approximate linear sum of the delta modulated speech signals. The application of the feedback bit to the up-down counter can be controlled by the binary counter so that the output signal can represent either a reduced or an amplified linear sum of the delta modulated speech signals.

8 Claims, 2 Drawing Figures

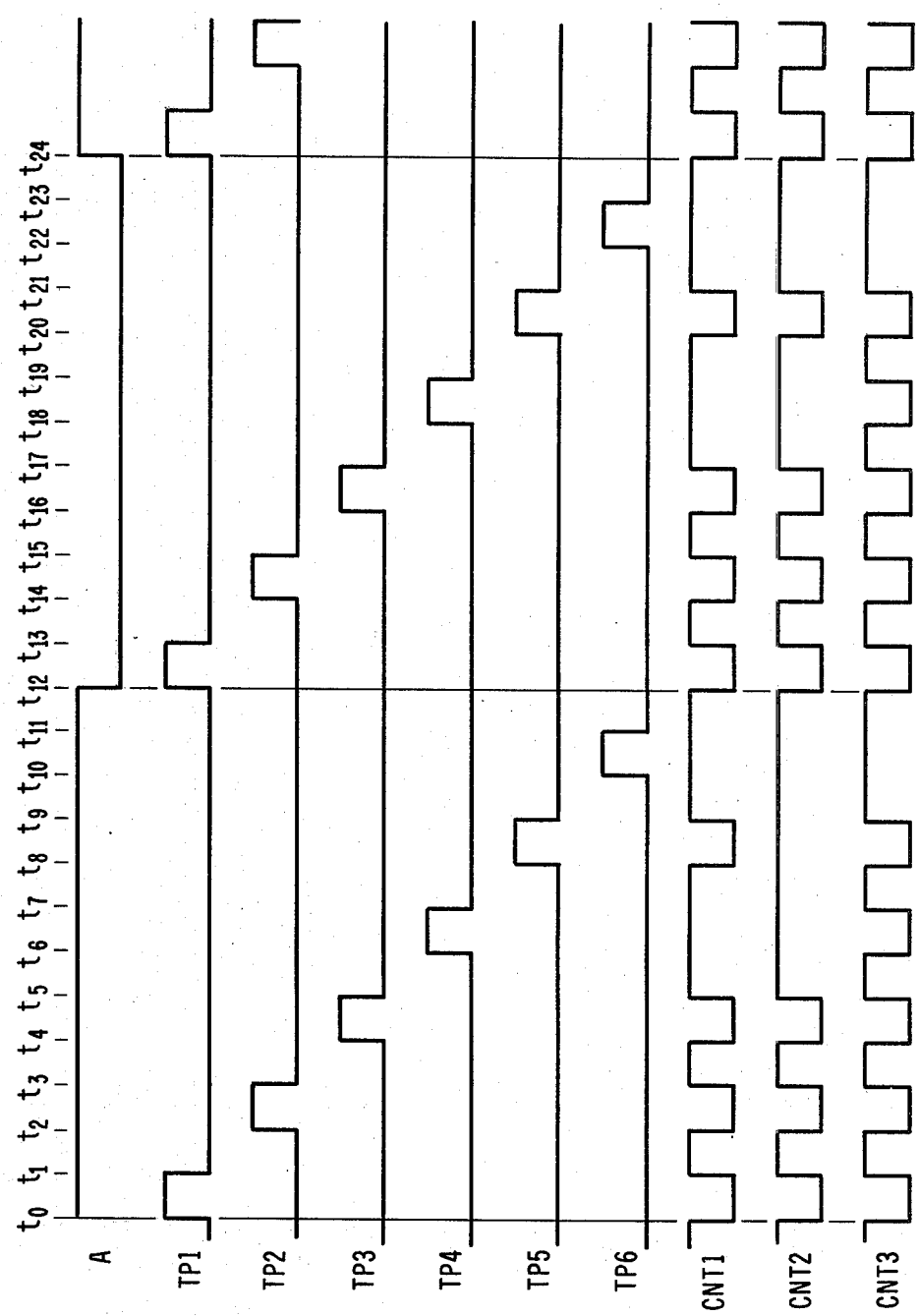

CIRCUIT FOR COMBINING DELTA MODULATED SIGNALS

TECHNICAL FIELD

This invention relates generally to delta modulation communications systems and, more particularly, to circuits for combining delta modulated signals.

BACKGROUND OF THE INVENTION

Generally, conference circuits are used to combine speech signals and to generate a resultant signal which in effect, represents the sum of the speech input signals. Delta modulation is a pulse modulation technique in which a continuous analog signal is converted into a digital bit stream for transmission via a selected medium. Conference circuits for combining delta modulated speech signals are well known in the art. In one typical prior art conference circuit, each of the delta modulated speech signals in digital form is decoded into an analog signal. All of these analog signals are linearly summed to form a resultant analog signal which is encoded into a resultant delta modulated signal. Another pulse modulation technique is pulse code modulation. In one typical prior art conference circuit, pulse code modulated speech signals in digital form are directly added by a digital adder to form a resultant pulse code modulated signal. However, a logic circuit for combining pulse code modulated signals is not suited for combining delta modulated signals. A pulse code modulated signal is comprised of groups of pulses or bits, typically eight in number, and each group represents the magnitude of an analog signal when sampled. Pulse code modulated signals can be directly added to represent the linear sum of the magnitudes of corresponding analog signals. By comparison, in a delta modulated signal, each bit only represents the direction of change in the magnitude of an analog signal; thus, the result obtained by the binary addition of delta modulated signals would not represent the linear sum of the magnitudes of corresponding analog signals.

Prior conference circuits for combining delta modulated speech signals suffer from the problem of requiring a decoder circuit for converting each delta modulated speech signal to an analog signal prior to summation and an encoder circuit for converting the resultant analog signal to a resultant delta modulated signal. The use of these decoder and encoder circuits results in increased bit error probability, increased sampling noise, and increased cost.

SUMMARY OF THE INVENTION

In accordance with this invention, a plurality of analog signals which have been converted to digital form by delta modulation are combined to generate an output signal in digital form representing the approximate linear sum of the input signals, without the necessity for delta modulation decoding and encoding circuitry. During each clock cycle, one bit from each of the delta modulated signals is selected by a multiplexer to form a group of digital bits, to which may be added a feedback bit. The bits are sequentially applied to an up-down counter. Each bit applied to the counter has two states, and bits in one state cause the count to be incremented while bits in the other state cause the counter to be decremented. One bit of the output signal is generated in each clock cycle, representing the state of the most significant bit position of the counter. A feedback bit representative of the state of the most significant bit in a prior cycle, is selectively applied to the counter in the same manner as are the input bits.

A feedback enable signal is selectively generated to control the gain of the circuit. The feedback bit may be applied to the counter once in each cycle to provide unity gain. Alternatively, the feedback bit may be applied in only specified cycles (e.g., every other cycle) to provide an amplified output signal, or the feedback bit may be applied more than once per cycle to provide a reduced output signal. A binary counter is provided which counts clock phase pulses to generate the feedback enable signal each time after a prescribed number of phase pulses have occurred.

BRIEF DESCRIPTION OF THE DRAWING

The invention may be better understood from the following detailed description when read with reference to the drawing in which:

FIG. 2 is a diagram of idealized signals, plotted with respect to time, depicting graphically certain of the operations of the circuit of FIG. 1.

DETAILED DESCRIPTION

Figure 1:
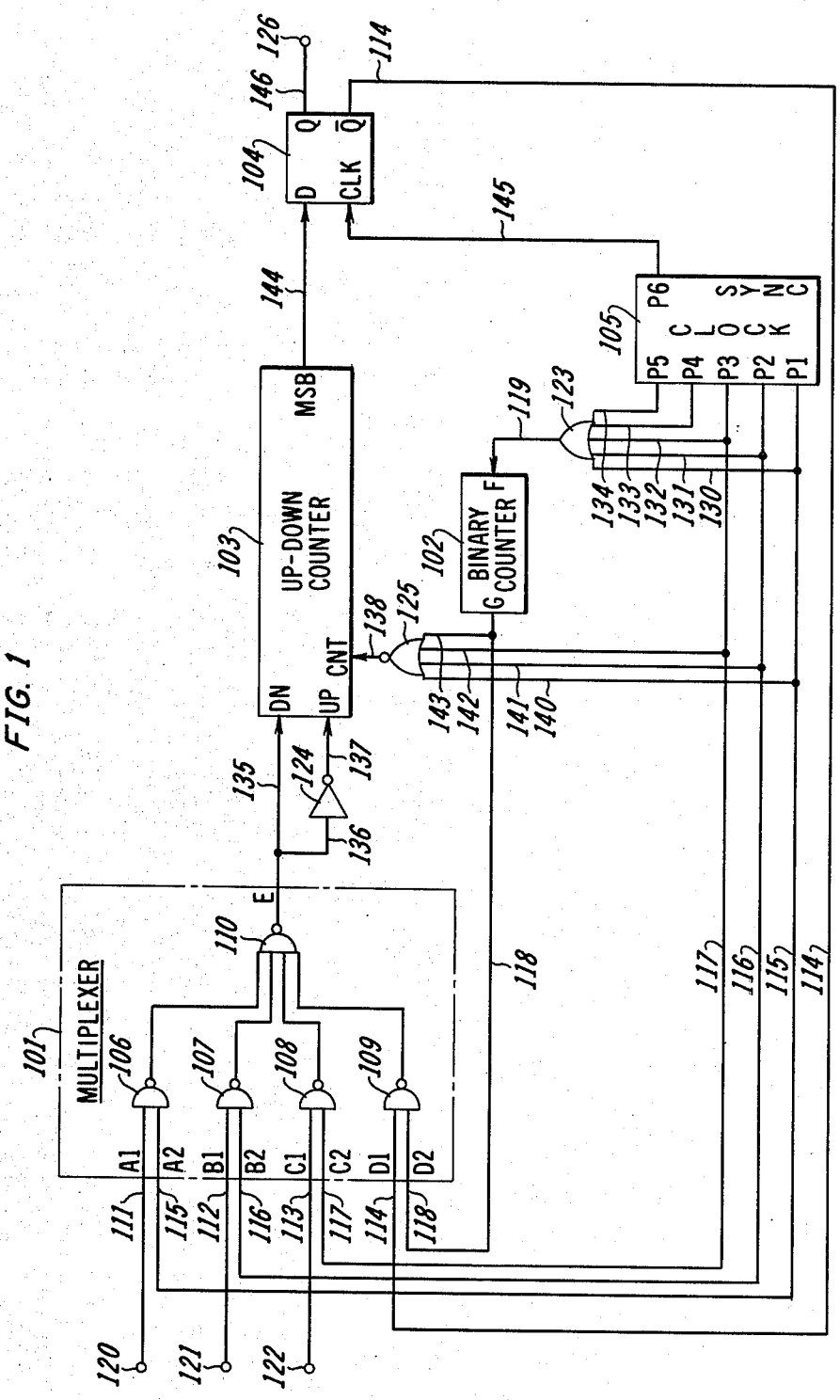
FIG. 1 represents an illustrative embodiment of a circuit in accordance with this invention.

One illustrative embodiment of the circuit in accordance with this invention, comprising a multiplexer 101, a binary counter 102, an up-down counter 103, a D-type flip-flop 104, and a clock 105, is shown in FIG. 1. A plurality of delta modulated speech signals in digital form is applied to the multiplexer. Each delta modulated speech signal is represented by a stream of input bits, and each input bit has inverse, high and low logic level states. During each clock cycle, the clock sequentially generates a plurality of phase signals. When certain ones of these phase signals are sequentially applied to the multiplexer, an input bit from each of the streams sequentially appears on the output of the multiplexer. Each input bit sequentially appearing on the output of the multiplexer either increments or decrements a count contained within the up-down counter. A bit in the high logic level state decrements the count, whereas a bit in the low logic level state increments the count. Later during the clock cycle, the state of the most significant bit position of the up-down counter is stored in the flip-flop. The output bit of the circuit assumes the state of the most significant bit position stored in the flip-flop. A feedback bit, which assumes the inverse state of the most significant bit position stored in the flip-flop, is sampled, along with an input bit from each of the streams during the next clock cycle, by the multiplexer to either increment or decrement the count. A stream of output bits taken from successive clock cycles represents the approximate linear sum of the delta modulated speech signals.

Multiplexer 101 has four pairs of input terminals A1-A2 through D1-D2 and an output terminal E and is used to sequentially sample the state of input terminals A1 through D1. The multiplexer is a well-known device and is commercially available. Typically, an input signal having inverse, high and low logic level states is applied to each of input terminals A1 through D1, and a phase signal having inverse, high and low logic level states is applied to each of input terminals A2 through D2. In one of two modes, the so-called passive mode, when a phase signal in the low logic level state is applied to each of input terminals A2 through D2, output terminal E assumes the low logic level state. In the other mode, the so-called active mode, when a phase signal in the high logic level state is applied to only one of input terminals A2 through D2, output terminal E assumes the state of the input signal applied to the corresponding input terminal of the pair.

One illustrative embodiment of multiplexer 101, comprising five NAND gates 106 through 110, is shown in FIG. 1. NAND gates are well-known devices and are commercially available. Each of NAND gates 106 through 109 has a pair of input terminals and one output terminal, whereas NAND gate 110 has four input terminals and one output terminal. The four pairs of input terminals of NAND gates 106 through 109 are connected to the four pairs of input terminals A1-A2 through D1-D2, respectively, and the four output terminals of NAND gates 106 through 109 are connected to the four input terminals of NAND gate 110, respectively. The output terminal of NAND gate 110 is connected to output terminal E. A signal in the low logic level state applied to any input terminal of a NAND gate causes the output terminal to assume a high logic level state. When a phase signal in the low logic level state is applied to each of input terminals A1 through D2, the output terminal of each of NAND gates 106 through 109 assumes a high logic level state regardless of the state of input terminals A1 through D1. A signal in the high logic level state applied to each input terminal of a NAND gate causes the output terminal to assume a low logic level state. Thus, with the four output terminals of NAND gates 106 through 109 assuming the high logic level state, the output terminal of NAND gate 110 and output terminal E assume the low logic level state. With all but one input terminal to a NAND gate in the high logic level state, the output terminal will assume the inverse state of the signal applied to the one remaining input terminal of the gate. When a phase signal in the high logic level state is applied to only one of the four input terminals A2 through D2 with the other three input terminals remaining in the low logic level state, the output terminal of the NAND gate connected to that one input terminal will assume the inverse state of the input signal applied to the corresponding input terminal of the pair, while the output terminals of the other three NAND gates, which are connected to the other three input terminals, remain in the high logic level state. Thus, with three of four input terminals of NAND gate 110 assuming the high logic level state, the output terminal of NAND gate 110 and output terminal E assume the logic level state of the input signal applied to the corresponding input terminal of the pair having the phase signal in the high logic level state applied thereto.

During each clock cycle when a phase signal in the high logic level state is sequentially applied to each of input terminals A2 through C2 of the multiplexer, each bit applied to corresponding input terminals A1 through C1 of the multiplexer sequentially appears on output terminal E. As shown in FIG. 1, input terminals A1 through C1 of the multiplexer are connected to input terminals 120 through 122 of the circuit, respectively, via conductors 111 through 113, respectively. A stream of input bits representing a delta modulated speech signal is applied to each of input terminals 120 through 122 of the circuit. Input terminal D2 of the multiplexer is connected to output terminal $\overline{Q}$ of the flip-flop via conductor 114. Once each clock cycle, the state of the most significant bit position of the up-down counter is stored in the flip-flop, and output terminal $\overline{Q}$ of the flip-flop and input terminal D1 of the multiplexer assume the inverse state of the most significant bit position stored in the flip-flop. Also shown in FIG. 1, input terminals A2 through C2 of the multiplexer are connected to output terminals P1 through P3 of clock 105, respectively, via conductors 115 through 117, respectively. Input terminal D2 is connected to output terminal G of binary counter 102 via conductor 118. Input terminal F of binary counter 102 is connected to the output terminal of OR gate 123 via conductor 119. The five input terminals of OR gate 123 are connected to output terminals P1 through P5 of clock 105, respectively, via conductors 130 through 134, respectively. During each clock cycle, the clock sequentially generates a phase pulse in the high logic level state on each of output terminals P1 through P6. Binary counter 102 may be designed to generate a feedback enable pulse, for example, during the receipt of a fifth phase pulse, and to be reset after each time it receives five phase pulses from clock 105 via OR gate 123. Thus, during each clock cycle, three phase pulses and a feedback enable pulse are sequentially applied to input terminals A2 through D2, respectively, and one bit from each of the streams of input bits applied to input terminal A1 through C1 and a feedback bit applied to input terminal D1 sequentially appear on output terminal E. Output terminal E of multiplexer 101 is connected to input terminal DN of up-down counter 103 via conductor 135 and to the input terminal of inverter 124 via conductor 136. The output terminal of inverter 124 is connected to input terminal UP of up-down counter 103 via conductor 137.

Up-down counter 103 has a plurality of stages or bit positions, including a most significant bit position, for containing each bit of a count. The up-down counter has enough stages, for example, eight, to prevent overflow of the count. During each clock cycle, each bit sequentially appearing on output terminal E of the multiplexer causes the count to be either incremented or decremented. A bit in the high logic level state decrements the count by one, whereas a bit in the low logic level state increments the count by one. Counter 103 has input terminals UP, DN, and CNT and output terminal MSB. The up-down counter is a well-known device and is comprised of commercially available components. Functionally, when a bit in the high logic level state is applied to the UP input terminal, the count will be incremented immediately after the occurrence of the trailing edge of an enable pulse in the low logic level state occurring on the CNT input terminal. When a bit in the high logic level state is applied to the DN input terminal, the count will be decremented immediately after the occurrence of the trailing edge of an enable pulse in the low logic level state occurring on the CNT input terminal. The enable pulses, which are applied to the CNT input terminal, are generated on the output terminal of NOR gate 125 in response to the phase pulses generated on output terminals P1 through P3 of clock 105 and the feedback enable pulse on output terminal G of binary counter 102. The output terminal of NOR gate 125 is connected to the CNT input terminal of up-down counter 103 via conductor 138, and the four input terminals of NOR gate 125 are connected to the three output terminals P1 through P3 of clock 105 and output terminal G of binary counter 102 via conductors 140 through 143, respectively. After each bit sequentially appearing on output terminal E of the multiplexer has either incremented or decremented the count, the state of the most significant bit position of the up-down counter, which is present on output terminal MSB, is stored in the flip-flop. Output terminal MSB of up-down counter 103 is connected to input terminal D of flip-flop 104 via conductor 144.

Flip-flop 104 has input terminals D and CLK and output terminals Q and $\overline{Q}$. The D-type flip-flop is a well-known device and is commercially available. Functionally, the flip-flop will store the state of the most significant bit position of the up-down counter applied to the D input terminal immediately after the occurrence of the leading edge of a phase pulse in the high logic level state generated from output terminal P6 of the clock and applied to the CLK input terminal via conductor 145. The Q output terminal of the flip-flop assumes the state of the most significant bit position of the up-down counter stored in the flip-flop, while the $\overline{Q}$ output terminal assumes the inverse state of the most significant bit position stored in the flip-flop. The feedback signal assumes the state of the $\overline{Q}$ output terminal of the flip-flop and is applied to the D1 input terminal of the multiplexer. The output signal of the circuit assumes the state of the Q output terminal and is taken from output terminal 126 of the circuit connected to the Q output terminal via conductor 146.

During each clock cycle, the clock sequentially generates a phase pulse, which is in the high logic level state, on each of its output terminals. The duration of a clock cycle can be defined as the time between the leading edges of the two successive phase pulses occurring on one of output terminals P1 through P6. The clock is a well-known device. As mentioned earlier herein, clock 105 has output terminals P1 through P6 of which output terminals P1 through P5 are connected to input terminal F of binary counter 102 via OR gate 123. Clock 105 also has an input terminal SYNL to which an external synchronization signal may be applied.

Binary counter 102 controls the application of the feedback signals to the up-down counter and the gain of the circuit. The frequency of application of the feedback signal defines the gain of the circuit. The gain of the circuit is proportional to the frequency (the number of times per clock cycle) with which input bits are applied to the counter, and inversely proportional to the frequency with which the feedback bits are applied. This can be analytically shown and may be represented by the equation: $A = N_i/N_f$, where A is the gain (amplification); $N_i$ is the number of times that the input bit is gated into the up-down counter per clock cycle; and $N_f$ is the number of times that the output bit is fed back into the up-down counter per clock cycle. When the output signal must represent the approximate linear sum of the delta modulated input signals with unity gain, binary counter 102 generates one feedback enable pulse, for example, during each cycle upon receiving a fifth phase pulse, and is reset every time it receives five phase pulses from clock 105. If an output signal which represents a reduced linear sum of the delta modulated input signals is desired, binary counter 102 may be designed so as to generate more than one feedback enable pulse, for example, during each cycle upon receiving every fourth and fifth phase pulse, and to reset every time it receives five phase pulses. Also, if an output signal which represents an amplified linear sum of the delta modulated input signal is desired, binary counter 102 may be designed so as to generate one feedback enable pulse once every several cycles and to reset every time it receives a number of phase pulses corresponding to several cycles. For example, a binary counter may be designed to generate one feedback enable pulse upon receiving a ninth phase pulse and to reset after each time it receives ten phase pulses. Binary counters including circuitry for resetting and selectively generating output pulses to perform each of the three aforementioned functions are well known in the art.

The operation of the circuit of FIG. 1 may be better understood with reference to the timing diagram of FIG. 2. Two cycles of clock 105 occur between times $t_0$ and $t_{24}$, one cycle between times $t_0$ and $t_{12}$, the other cycle between times $t_{12}$ and $t_{24}$. Adjacent to the designation A in FIG. 2, between times $t_0$ and $t_{24}$, is a graphical representation of two idealized bits of a stream of input bits representing a delta modulated speech signal. Also shown in FIG. 2, adjacent to each of the six designations TP1 through TP6 are two idealized phase pulses of a phase signal as generated during two clock cycles by clock 105 on output terminals P1 through P6, respectively. Adjacent to designations CNT1, CNT2, and CNT3 is a graphical representation of a plurality of idealized enable pulses of three different enable signals. Enable signal CNT1 is applied to the CNT input terminal of up-down counter 103 to produce an output signal which represents the approximate linear sum of the delta modulated speech signals with unity gain. Enable signal CNT2 is applied to up-down counter 103 to produce an output signal which represents a linear sum of the delta modulated speech signals amplified by a factor of two. Similarly, enable signal CNT3 is applied to up-down counter 103 to produce an output signal which represents a linear sum of the delta modulated speech signals reduced by a factor of two. Enable signals CNT1, CNT2, and CNT3 appear on the output terminal of NOR gate 125 in response to the phase pulses generated on output terminals P1 through P3 of clock 105 and the feedback enable pulse on output terminal G of binary counter 102. A stream of input bits representing a delta modulated speech signal is applied to each of input terminals 120 through 122 of the circuit. The circuit combines these delta modulated signals to generate a stream of output bits on output terminal 126 of the circuit, whereby it can be analytically shown that the stream of output bits represents the approximate linear sum of the delta modulated speech signals. For purposes of this illustrative embodiment, it will be assumed that the input bit streams are of the same frequency, which may be, for example, 33⅓K bits/second, and of the same phase. As will be described hereinafter, buffering means will be discussed such that this requirement may be relaxed. An external synchronization signal may be applied to the SYNC input terminal of clock 105 to lock the clock to the frequency of the input bit stream. All six phase pulses must occur within the duration of an input bit, which may be, for example, 30 microseconds. Each phase pulse must occur for a sufficient period of time, which may be, for example, 2½ microseconds, to allow the circuit to reach a steady state condition in response to the application of a phase pulse. There must also be sufficient time between each phase pulse, which may be, for example, 2½ microseconds, to allow the circuit to reach a steady state condition after the application of a phase pulse.

An input bit is applied to each of input terminals A1 through C1 of the multiplexer at approximately the same time, for example, $T_0$, as shown in FIG. 2. A feedback bit has been applied to the D1 input terminal of the multiplexer for a short period of time, for example, 5 microseconds. It will also be assumed that the three input bits and the feedback bit occur for an equal period of time, which may be for example, 30 microseconds. At time $t_0$, with an input bit applied to each of input terminals A1 through C1 and a feedback bit applied to input terminal D1 of the multiplexer, timing pulse TP1 assumes a high logic level, and signal CNT1 assumes a low logic level. Between times $t_0$ and $t_1$, timing pulse TP1 is maintained at a high logic level, and timing pulses TP2 through TP6 and enable signal CNT1 are maintained at a low logic level. Multiplexer 101 is in the active mode with output terminal E assuming the state of the input bit applied to input terminal A1. With output terminal E assuming the state of the input bit on terminal A1, input terminal DN of the up-down counter also assumes the state of the input bit applied to input terminal A1 of the multiplexer. The UP input terminal of the up-down counter assumes the inverse state of the input bit on terminal A1 of the multiplexer due to the inversion function performed by inverter 124.

At time $t_1$, phase pulse TP1 changes from a high to a low logic level, and signal CNT1 changes from a low to a high logic level. Changing the logic level from a low to a high on input terminal CNT causes the count contained within the up-down counter to be either incremented or decremented one depending on the logic levels on the DN and UP input terminals. If a high logic level is present on the DN input terminal and a low logic level on the UP input terminal, the count will be decremented one. If a high logic level is present on the UP input terminal and a low logic level on the DN input terminal, the count will be incremented one. Assuming the count is zero before time $t_1$, decrementing the count one causes the most significant bit to assume a high logic level. Incrementing the count one causes the most significant bit to assume a low logic level. Between times $t_1$ and $t_2$, phase pulses TP1 through TP6 are maintained at a low logic level, while signal CNT1 is maintained at a high logic level. With phase pulses TP1 through TP3 and the feedback enable pulse maintained at a low logic level, the multiplexer is in the passive mode, and output terminal E is maintained at a low logic level. During this period of time, the circuit is allowed to reach a steady state condition.

Similarly, at times $t_2$, $t_4$, and $t_8$ as shown in FIG. 2, phase pulses TP2 and TP3 and the feedback enable pulse assume a high logic level, respectively, and signal CNT1 again assumes a low logic level. Between times $t_2-t_3$, $t_4-t_5$, and $t_8-t_9$ the multiplexer is once again in the active mode with the DN input terminal of the up-down counter assuming the state of the bit present on input terminals B1, C1, and D1 of the multiplexer, respectively, while the UP input terminal assumes the inverse state of the DN input terminal. At times $t_3$, $t_5$, and $t_9$, phase pulses TP2 and TP3 and the feedback enable pulse assume a high logic level, respectively, and signal CNT1 changes from a low to a high logic level. Changing the logic level of signal CNT1 from a low to a high causes the count to be either incremented or decremented at times $t_3$, $t_5$, and $t_9$. In a similar manner, between times $t_3-t_4$, $t_5-t_8$, and $t_9-t_{10}$, the circuit is once again allowed to reach a steady state condition.

At time $t_{10}$, timing pulse TP6 changes from a low to a high logic level thereby causing the Q output terminal of flip-flop 104 to be set to the state of the most significant bit position of the up-down counter. The $\overline{Q}$ output terminal of the flip-flop assumes the inverse state of the most significant bit position. The feedback bit assumes the state of the $\overline{Q}$ output terminal and is fed back to input terminal D1 of the multiplexer to be sampled during the next cycle of the clock. At time $t_{11}$, phase pulse TP6 assumes a low logic level thereby allowing the circuit to, once again, reach a steady state condition.

At time $t_{12}$, the next cycle of clock 105 is started, and the next input bit of each of the delta modulated input signals is applied to input terminals A1 through C1 of the multiplexer. During the next clock cycle, between times $t_{12}$ and $t_{24}$, timing pulses TP1 through TP6 as well as signal CNT1 are applied to the circuit in the same manner as between times $t_0$ and $t_{12}$ to produce the next output bit on the Q output terminal of the flip-flop. Clock 105 is continually cycled so as to produce a serial stream of output bits, which represents the approximate linear sum of the delta modulated speech signals applied to input terminals A1, B1, and C1 of the multiplexer.

It will be appreciated that if amplification of the linear sum of the delta modulated speech signals represented by the output signal is desired, the feedback bit can be applied to the up-down counter once every other cycle along with enable signal CNT2 to produce an output signal with twice the gain of the combined input signals. Similarly, this scheme can be used to produce output signals with gains of three, four, or even more. If a reduced linear sum of the delta modulated input signals represented by the output signal is desired, the feedback bit can be applied to the counter twice each clock cycle along with enable signal CNT3 to produce an output signal with one-half the gain of the combined input signals. This scheme can also be used to produce output signals with gains of one-third, one-fourth, or even less.

As previously described herein, it is assumed that the input bits are applied to input terminals A1 through C1 of the multiplexer are applied at approximately the same time. If this is not the case, a buffering circuit, comprising three D-type flip-flops, may be connected to the three input terminals 120 through 122 of the circuit, respectively, to cause the input bits to be applied at the same time by triggering the flip-flops by phase pulse TP1. Another means of buffering the input bits to the circuit would be to insert two shift registers, one a serial-in parallel-out shift register, the other a parallel-in serial-out shift register, between output terminal E of the multiplexer and conductors 135 and 136.

It is to be understood that the above described arrangement is merely an illustrative application of the principles of this invention and that numerous other arrangements may be devised by those skilled in the art without departing from the spirit and scope of the invention.

What is claimed is:

1. An electrical circuit for combining a plurality of streams of input bits representing delta modulated analog signals in digital form, each input bit having a first and a second state, characterized in that said circuit comprises:

counter means (103) responsive to increment and decrement signals to increment or decrement, respectively, a count contained therein and having a most significant bit position;

clock means (105) for generating signals defining clock cycles;

circuit means (104) connected to said counter means and said clock means for generating an output signal representative of the state of said most significant bit position in each clock cycle and a feedback bit, having said first and said second state, representative of the state of said most significant bit position in a first clock cycle; and multiplexer means (101, 124) for sampling an input bit from each of said streams and said feedback bit and applying to said counter means an increment signal for each sampled bit in said first state and a decrement signal for each sampled bit in said second state, in a second subsequent clock cycle, whereby a plurality of said output signals generated in a plurality of successive clock cycles represents the approximate linear sum of said delta modulated analog signals in digital form.

2. An electrical circuit in accordance with claim 1 further characterized in that said clock means comprises means for generating a plurality of phase signals in sequence in each clock cycle and said multiplexer means is connected to said clock means and responsive to said phase signals to sequentially sample one bit of each of said streams of input bits in each clock cycle.

3. An electrical circuit in accordance with claim 1 or claim 2 wherein said circuit means comprises bistable means for storing the state of said most significant bit position and for supplying during one cycle an output signal and a feedback signal representative of the states of said most significant bit position in a prior clock cycle.

4. An electrical circuit in accordance with claim 1 further characterized in that said multiplexer means comprises means (109, 110) responsive to a feedback enable signal for applying said feedback signal to said counter means and said electrical circuit further comprises feedback control means (102) connected to said clock means and said multiplexer means for selectively generating said feedback enable signal in only certain of said clock cycles, whereby a stream of said output bits represents an amplified linear sum of said delta modulated signals.

5. An electrical circuit in accordance with claim 1 further characterized in that said multiplexer comprises means (109, 110) responsive to a feedback enable signal to apply said feedback signal to said counter means and said electrical circuit further comprises feedback control means (102) connected to said clock means and said multiplexer for selectively generating a plurality of said feedback control signals in each clock cycle, whereby a stream of said output bits represents a reduced linear sum of said delta modulated signals.

6. An electrical circuit in accordance with claim 4 or claim 5 further characterized in that said clock means comprises means for sequentially generating a plurality of phase signals in each clock cycle and said feedback control means comprises counter means responsive to said phase signals to generate said feedback enable signals after occurrence of a prescribed number of said phase pulses.

7. An electrical circuit in accordance with claim 2 characterized in that said counter means is responsive to said increment and decrement signals only in the presence of an enable signal and said electrical circuit further comprises means (125) for generating said enable signal each time one of said phase signals is applied to said multiplexer means and said circuit means comprises bistable means responsive to one of said phase signals occurring later in time than said phase signals applied to said multiplexer means, for storing a state of said most significant bit position and for generating said output signal and said feedback bit, said feedback bit having a state which is the inverse of the state of said output signal.

8. An electrical circuit in accordance with claim 7 characterized in that multiplexer means comprises means (109, 110) responsive to a feedback enable signal to apply said feedback signal to said counter means and said electrical circuit further comprises counter means (102) connected to said clock means and said multiplexer means and responsive to said phase signals to generate said feedback enable signal after the occurrence of a prescribed number of said phase pulses.

* * * * *